(12) United States Patent
Shen et al.

(10) Patent No.: US 7,831,265 B1
(45) Date of Patent: Nov. 9, 2010

(54) MOBILE RATE CONTROL IN MOBILE TO MOBILE VIDEO COMMUNICATION

(75) Inventors: Jun Shen, Redmond, WA (US); Venson Shaw, Kirkland, WA (US); Yung Shirley Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 561 days.

(21) Appl. No.: 11/936,538

(22) Filed: Nov. 7, 2007

(51) Int. Cl.
H04Q 7/20 (2006.01)
(52) U.S. Cl. ............. 455/464; 455/450; 455/516; 455/552.1; 455/420
(58) Field of Classification Search ......... 455/517, 455/100, 552.1, 550.1, 442, 560, 561, 420, 455/450, 464, 509, 516, 425, 511; 370/329, 370/235, 335, 278
See application file for complete search history.

(56) References Cited

U.S. PATENT DOCUMENTS

2004/0028081 A1* 2/2004 Chang et al. ............. 370/490
2004/0203857 A1* 10/2004 Wang ..................... 455/456.1
2005/0170860 A1* 8/2005 Striuli .................... 455/552.1
2005/0207343 A1* 9/2005 Han, II ..................... 370/235
2007/0254656 A1* 11/2007 Dalsgaard ............... 455/435.1

* cited by examiner

Primary Examiner—Tan Trinh
(74) Attorney, Agent, or Firm—Moazzam & Associates, LLC

(57) ABSTRACT

A system for a mobile wireless communications device configured to stream video to a peer device over a mobile wireless network, the device configured to increase the radio channel capacity between the wireless communication devices and the network to allow faster video encoding and transmission. The video transmitting device receives measurements on radio conditions related to the radio channels carrying the video and determines if the radio conditions can support an increased channel capacity. If so, the transmitting device sends a request to the network to increase capacity on the radio channels. If the network determines that the other resources transporting the video can support an increase in traffic resulting from an increase in the radio channel capacity, then the network sends orders to carry out a radio channel capacity increase.

19 Claims, 6 Drawing Sheets

MOBILE RATE CONTROL IN MOBILE TO MOBILE VIDEO COMMUNICATION

BACKGROUND OF THE INVENTION

1. Field of the Invention

The present invention is directed generally to mobile wireless communication devices and the mobile wireless networks that serve them. In particular, the invention is directed to peer-to-peer streaming video between mobile wireless communication devices.

2. Description of the Related Art

Providers of mobile wireless communication networks are offering more and more services beyond voice communications. One highly desirable service to add is peer-to-peer video communications, which enables one mobile wireless device to send streaming video to another such device over a mobile wireless network. Software applications already exist to enable a mobile wireless device to encode video and stream it to another mobile wireless device. However, current mobile wireless devices and networks lack certain features that would allow peer-to-peer video applications to more fully control the quality of the video viewing experience.

A video is a series of frames that can be shown in sequence by a video player to create a video viewing experience. The quality of the viewing experience is influenced by the resolution of the frames and the rate at which the frames are played.

Resolution is the amount of detail in a frame. Videos with higher frame resolutions are perceived by most viewers as having higher quality.

The playback frame rate is also important for good quality video viewing. The playback frame rate must be fast enough for a viewer's vision persistence to perceive the video as smoothly flowing images. If the playback frame rate is too slow, then viewers will perceive frames individually, which will make objects in the video seem to move in an erratic fashion. Video players thus attempt to maintain a playback frame rate above a certain minimum frame rate.

A video player usually stores the frames it receives temporarily in a buffer before playing them. If rate the buffer receives frames is less than the current playback frame rate, the number of frames stored in the buffer will decrease. A complete halt in displaying a video is considered worse than a slow down, so if the buffer is low on frames, the video player may slow down the playback frame rate.

A video as originally recorded is a stream of data with a bit rate that is proportional to the product of the recorded frame resolution and the recorded frame rate. However, high video bit rates may require too much memory to store or too much bandwidth to transmit in some applications. Video codecs may be used to compress the video data stream, resulting in an encoded video stream with an encoding rate that is substantially less than the original video bit rate. Since most compression techniques are lossy, decreasing the encoding rate by increasing the compression may come at a cost of reduced video quality.

A mobile wireless device's video encoding rate can be limited by the transmission rate at which the mobile wireless device sends the encoded video stream to a receiving mobile wireless device. Buffers on the transmitting and receiving devices can store part of the encoded video stream that the transmitting device is not yet ready to send or the receiving device is not yet ready to playback. These buffers allow the video encoding rate to be slightly faster or slower than the video transmission rate for short periods of time, but since the buffers have a finite size, larger or longer variations can lead to buffer overflow and the loss of some of the video.

The video transmission rate at which the transmitting device sends the encoded video to the receiving device can be limited by the capacity of channels used to transport the encoded video. The capacity of a channel is the maximum data transmission rate the channel can transport, not including any channel overhead.

To facilitate transport of a peer-to-peer video, a mobile wireless network may provide a first radio transport channel between the mobile wireless device transmitting the video and the network. A second radio transport channel may be provided by the mobile wireless network between the network and the mobile wireless device receiving the video. For example, in mobile wireless networks based on the Universal Mobile Telecommunications Service (UMTS) version of the Wideband Code Division Multiple Access (WCDMA) protocol, the network generates a radio link divided into physical channels on to which transport channels can be mapped. Each physical channel is part of a group of physical channels that have the same base carrier frequency, but are distinguished by modulating the data stream for each channel with a chip code unique within the group of physical channels. The chip codes are generated at a constant rate. The capacity of each physical channel is determined by a value known as the spreading factor, which is the number of chips each data bit is spread across. Another protocol used on UMTS networks, High Speed Downlink Packet Access (HSDPA) can map a transport channel to more than one physical channel. This transport channel can be shared by multiple users.

The quality of these radio transport channels can vary over time due to changes in the radio environment. Such changes include interference from other mobile wireless devices in the vicinity accessing the same or different mobile wireless networks and signal fade from the mobile wireless device moving relative to the radio transceivers providing the radio transport channels.

When a radio environment changes for the worse, the radio transport channel quality may degrade to the point where an unacceptable amount of errors are made in the data being transmitted. In such a situation, the mobile wireless network may reduce the capacity of the affected radio transport channels in an attempt to maintain channel quality. This may be done in different ways. In UMTS/WCDMA networks, the capacity of a transport channel can be decreased by increasing the spreading factor of the underlying physical channel. Increasing the spreading factor aids the physical/transport channel in overcoming a poor radio environment. Conversely, the capacity of a transport channel/physical channel can be increased if the spreading factor is reduced. In UMTS/HSDPA networks, the spreading factor is fixed, but the capacity of a transport channel can be decreased by decreasing the number of physical channels the transport channel is mapped to. Decreasing the number of physical channels aids the remaining physical/transport channels in overcoming a poor radio environment. The transport channel capacity can also be decreased by decreasing the transport block size per the available radio power and radio link condition. If the UMTS/HSDPA transport channel is shared, then the priority of certain data streams can be increased to maintain the transmission rate of that stream.

Currently, video applications used on mobile wireless communication devices with mobile rate control react to a reduction in a radio transport channel capacity by decreasing the encoding rate of the video. The quality of each frame of video transmitted is reduced, but if the encoding rate remains less than or equal to the transmission capacity of the radio transport channel, then at least all or most frames will be transported to the viewer and the viewer will be spared the experience of viewing a herky-jerky video that results when many frames are dropped. However, if the radio environment later improves, current video applications have no way to increase the radio transport channel capacity.

BRIEF DESCRIPTION OF THE SEVERAL VIEWS OF THE DRAWING(S)

Figure 4A:
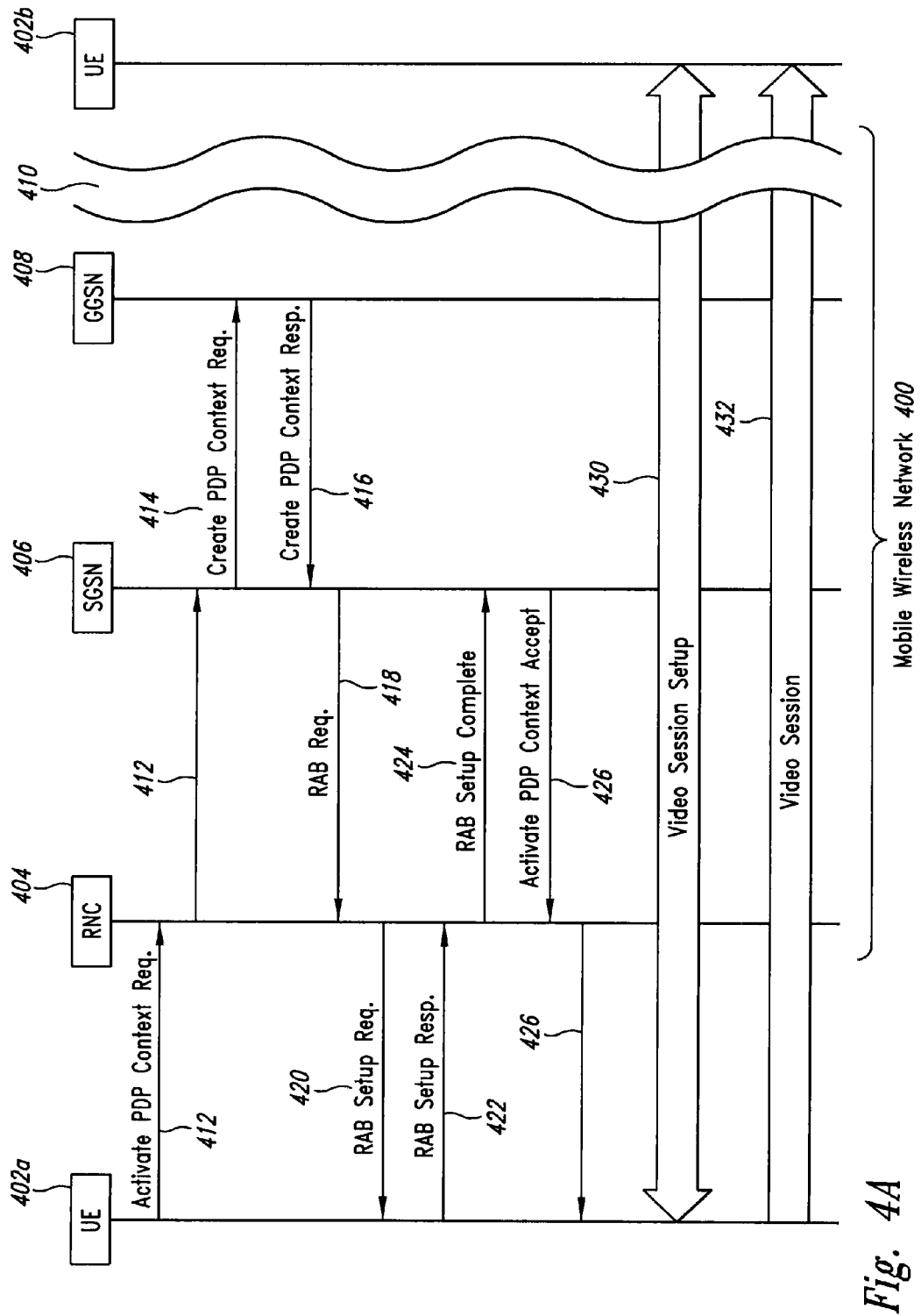
Figure 4B:
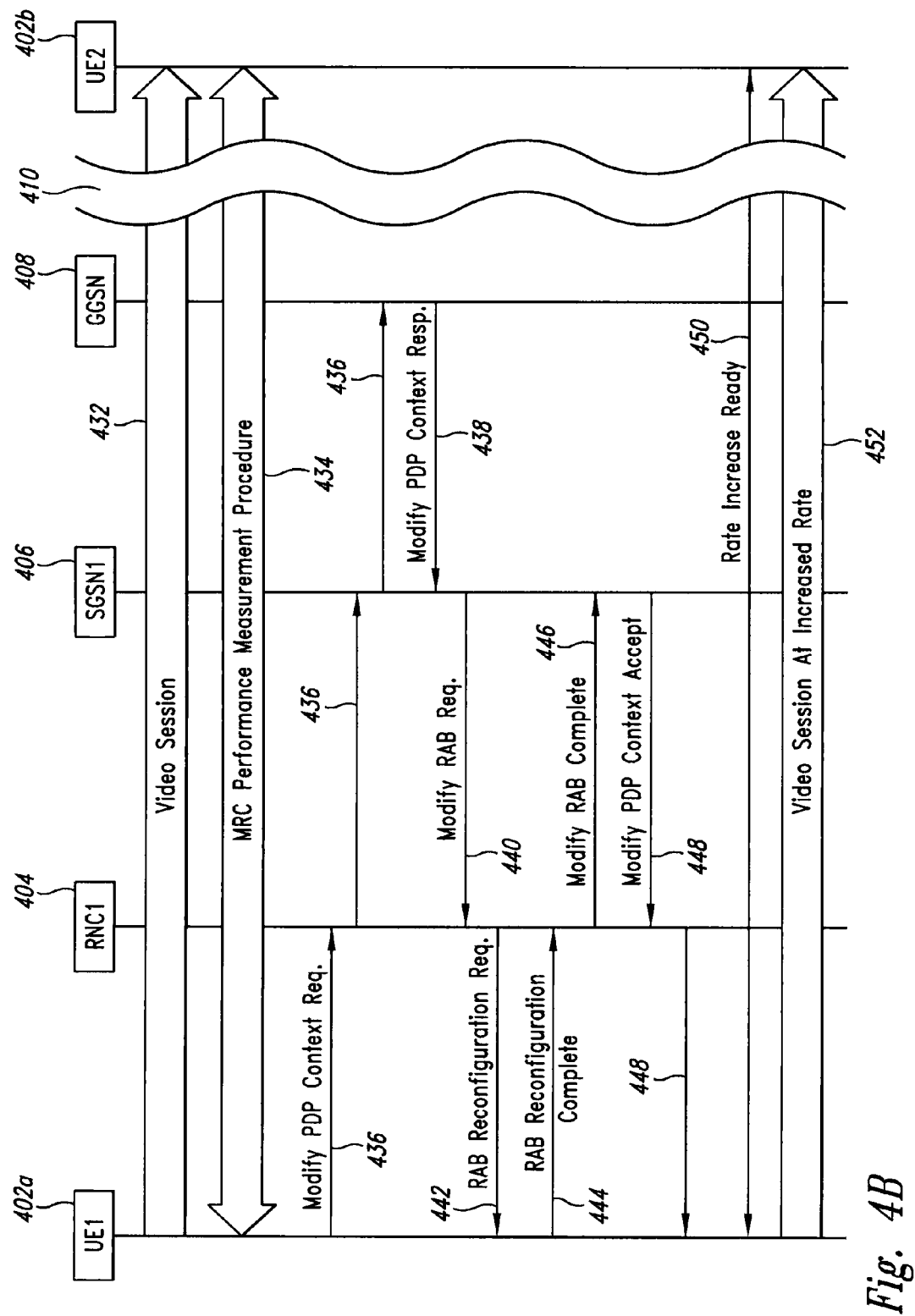

FIGS. 4a and 4b show a signal flow diagram of a UMTS/WCDMA embodiment of a method for a mobile wireless network to support on-request radio transport channel capacity increases. FIG. 4a shows the signal flow processes used to initially set up a video session. FIG. 4b shows the signal flow processes used to increase the transmission rate of the video session.

Figure 5:
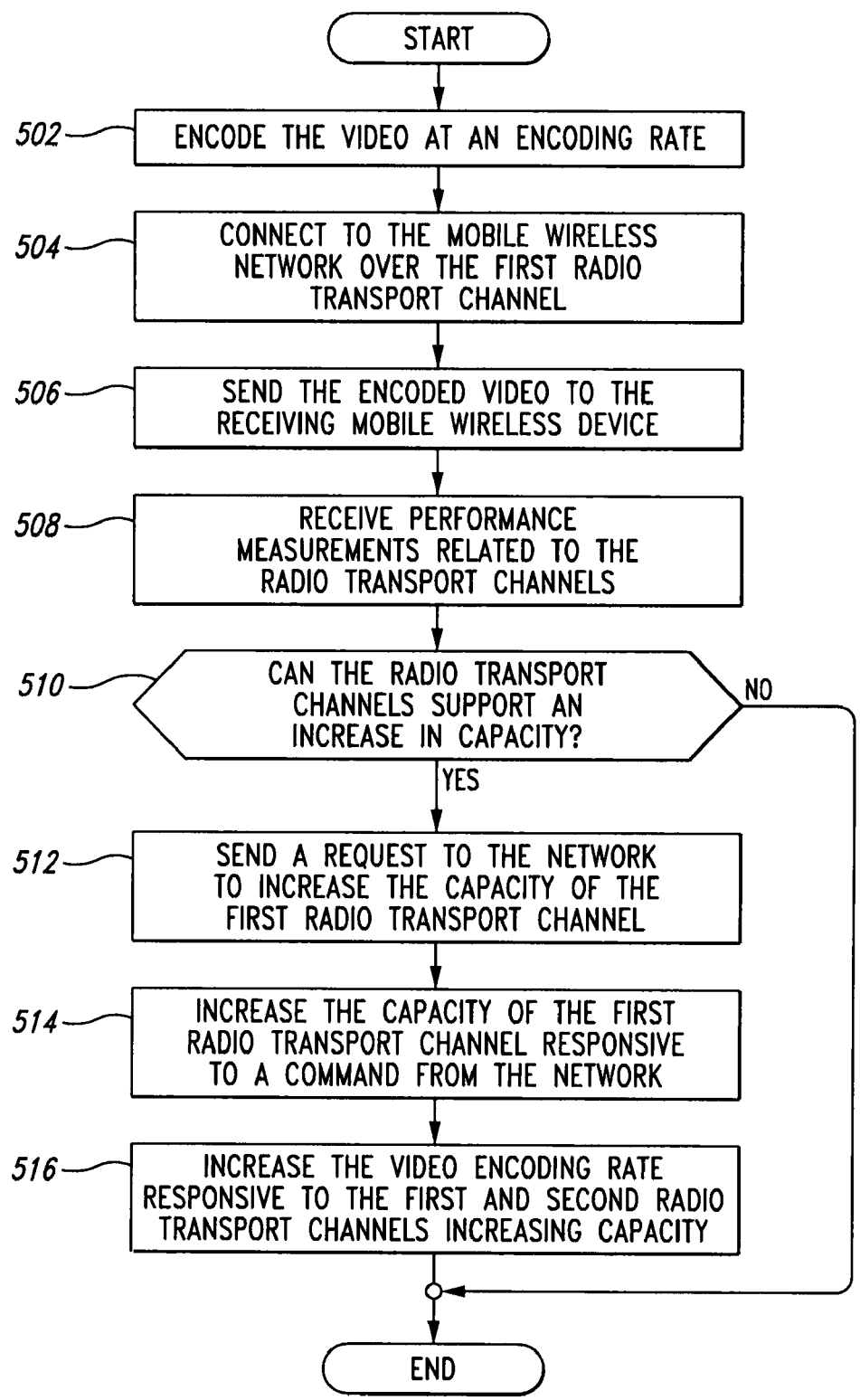

FIG. 5 shows a flow chart of a method for the transmitting mobile wireless device to transmit rate controlled video to the receiving mobile wireless device.

DETAILED DESCRIPTION OF THE INVENTION

Figure 1:
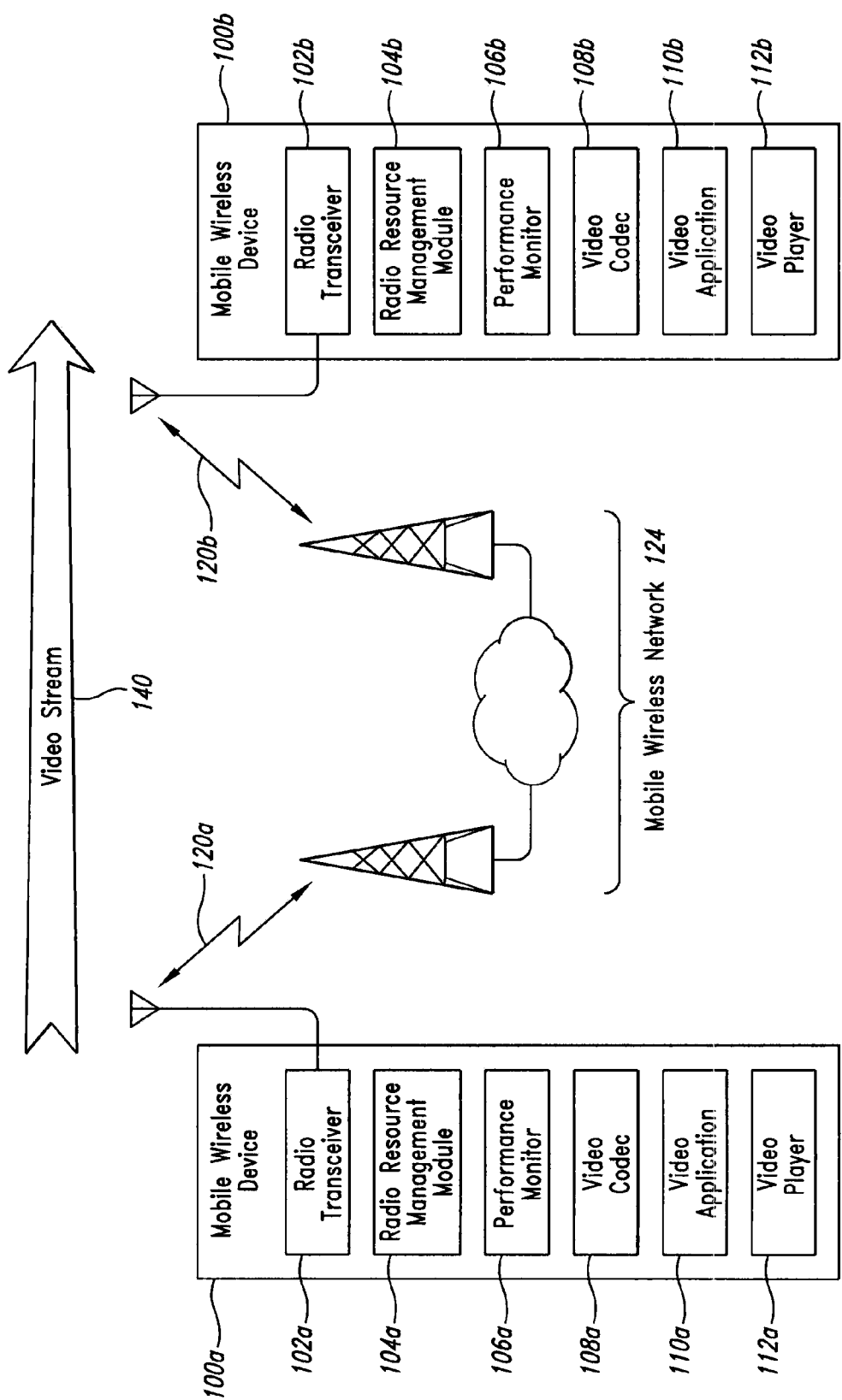
FIG. 1 shows a mobile wireless device configured to send an encoded video in rate controlled video stream to a second mobile wireless device over a mobile wireless network.

FIG. 1 shows a mobile wireless device 100a configured to send an encoded video in rate controlled video stream 140 to a second mobile wireless device 100b over a mobile wireless network 124. The first mobile wireless device 100a can connect to the mobile wireless network 124 through a radio transport channel 120a. The second mobile wireless device 100b can connect to the mobile wireless network 124 through a radio transport channel 120b.

In the embodiment shown in FIG. 1, the mobile wireless devices 100a, 100b are peers, with similar structure and functions. For purposes of illustration, the first mobile wireless device 100a is shown as transmitting the video stream 140 and will be referred to as the transmitting mobile wireless device 100a. Likewise, the second mobile wireless device 100b is shown as receiving the video stream 140 and will be referred to as the receiving mobile wireless device 100b. However, since both mobile wireless devices 100a, 100b are peers, the roles could be reversed, with the second mobile wireless device 100b transmitting the video stream 140 and the first mobile wireless device 100a receiving. Other embodiments have mobile wireless devices that are not peers. A non-peer transmitting wireless device would lack components or configurations needed to receive and display the video and a non-peer receiving device would lack components or configurations needed to encode and transmit the video.

In the peer-to-peer embodiment shown in FIG. 1, the transmitting mobile wireless device 100a comprises a radio transceiver 102a, a radio resource management module 104a, a performance monitor 106a, a video codec 108a, a video application 110a, and a video player 112a. The receiving mobile wireless device 100b is structured and configured similarly to the transmitting mobile wireless device 100a. The receiving mobile wireless device 100b comprises the radio transceiver 102b, a radio resource management module 104b, a performance monitor 106b, a video codec 108b, a video application 110b, and a video player 112b.

The radio transceiver 102a is configured to generate the radio transport channel 120a in cooperation with the mobile wireless network 124.

Radio transport channel 120a provides the transmitting mobile wireless device 100a the ability to connect to the mobile wireless network 124. Persons skilled in the art will appreciate the different kinds of protocols that may be used by the transmitting mobile wireless device 100a and the mobile wireless network 124 to generate the radio transport channel 120a. For example, one protocol that may be used is the Universal Mobile Telecommunications Service (UMTS) Wideband Code Division Multiple Access (WCDMA). However, other protocols may be used. In some embodiments, radio transport channel 120b between the mobile wireless receiving device 100b and the mobile wireless network 124 may be established according to the same protocol as the radio transport channel 120a. In other embodiments, radio transport channel 120b may be established according to a different protocol than radio transport channel 120a.

The video application 110a generates the video and sends it to the video codec 108a. The video application 110a may be configured to indicate a desired encoding rate to the video codec 108a. The video application 110a may be configured to generate a video in any way not inconsistent with the embodiment of the transmitting mobile wireless device 100a. For example, the video application 110a may generate the video through the use of a camera (not shown) that is a part of the transmitting mobile wireless device 100a. Alternatively, the video application 110a may generate the video by accessing the video from a storage device (not shown). Other known configurations to generate the video may be used.

The video codec 108a is configured to encode the video at an encoding rate in preparation for streaming. The video codec 108a is configured to send the encoded video to the radio transceiver 102a.

The radio transceiver 102a is configured to send the encoded video in a video stream 140 over radio transport channel 120a to the mobile wireless network 124. The video stream 140 can be transported across the mobile wireless network 124 and then transported across radio transport channel 120b to the receiving mobile wireless device 100b. The receiving mobile wireless device 100b can use its video codec 108b to decode the video stream 140 and present the decoded video to a user with the video player 112b.

The video codec 108a has the ability to change the encoding rate. In some embodiments, the video codec 108a is configured to change the encoding rate to the desired encoding rate indicated by the video application 110a. In some embodiments, the video codec 108a is configured not to increase the encoding rate unless it has received indication that the radio channel 120a capacity is adequate to carry the increased encoding rate. In some embodiments, the video codec 108a is configured to decrease the encoding rate if a transmit buffer between the video codec 108a and the radio transceiver 102a exceeds a capacity threshold. One cause of the transmit buffer capacity exceeding the threshold would be if the encoding rate is greater than the radio channel 120a capacity, causing encoded video to accumulate in the transmit buffer. In some embodiments, the video codec 108a sends a request for a desired radio channel 120a capacity to the RRM module 104a. In other embodiments, the video application 110a sends the request for the desired radio channel 120a capacity to the RRM module 104a.

The performance monitor 106a is configured to receive performance measurements of radio environments related to the radio transport channels 120*a*, 120*b*. The performance monitor 106*a* may be configured to receive different types of performance measurements. In some embodiments, the performance measurements received may be the received signal strength of the physical channel underlying the radio transport channel 120*a*. In other embodiments, the performance measurements received may be the signal to noise ratio of the physical channel underlying the radio transport channel 120*a*. Alternatively, the performance monitor 106*a* may be configured to receive other measurements or combination of measurements useful in judging quality of the radio transport channel 120*a*.

The performance measurements received by the performance monitor 106*a* may be made by various entities. In some embodiments, the transmitting mobile wireless device 100*a* is configured make the performance measurements of the radio environment related to radio transport channel 120*a* and the receiving mobile wireless device 100*b* is configured to make performance measurements of the radio environment related to radio transport channel 120*b*. The transmitting mobile wireless device 100*a* is configured to exchange performance measurements with the receiving mobile wireless device 100*b* over the mobile wireless network 124. In other embodiments, the mobile wireless network 124 is configured to make these performance measurements and then send the performance measurements to the transmitting mobile wireless device 100*a* and receiving mobile wireless device 100*b*. In yet other embodiments, the ability to make performance measurements of the radio transport channels 120*a*, 120*b* is divided amongst the mobile wireless network 124, the transmitting mobile wireless device 100*a*, and the receiving mobile wireless device 100*b*.

The RRM module 104*a* is configured to determine if the radio transport channels 120*a*, 120*b* can support an increase in capacity necessary to carry a desired increased encoding rate. The RRM module 104*a* is configured to make this determination by examining the performance measurements of the radio transport channels 120*a*, 120*b* or more specifically, the radio performance measurements of the underlying physical channels that carry the radio transport channels 120*a*, 120*b*.

The RRM module 104*a* is configured to send a request to the mobile wireless network 124 for the desired increase in the capacity of the radio transport channel 120*a*, if the RRM module 104*a* determines the radio environments related to the radio transport channels 120*a*, 120*b* carrying the encoded video can support the proposed increase in the capacity of the radio transport channels 120*a*, 120*b*.

The RRM module 104*a* is coupled with the radio transceiver 102*a* and configured to change the radio transport channel 120*a* capacity in response to an order received from the mobile wireless network 124 to do so. In some embodiments, the mobile device RRM module 104*a* can increase the radio transport channel 120*a* capacity by decreasing the spreading factor of the underlying radio physical channel. In other embodiments, the mobile device RRM module 104*a* can increase the radio transport channel 120*a* capacity for a particular user or users by changing the modulation scheme or modulation rate of the underlying physical channel, or by assigning more power and codes/tones for individual users. In yet other embodiments, the mobile device RRM module 104*a* increases radio transport channel 120*a* capacity for individual users by increasing the number of underlying physical channels to which the radio transport channel 120*a* is mapped. If radio transport channel 120*a* is shared, then the mobile device RRM module 104*a* can send a request to the mobile wireless network 124 to increase the priority of the encoded video.

Increasing the capacity of the radio transport channels 120*a*, 120*b* may not be desirable if the mobile wireless network 124 itself is unable to accommodate an increase in traffic resulting from the desired increase in the capacity of the radio transport channels 120*a*, 120*b* or if the mobile wireless devices are not authorized for the proposed increases in capacity of the radio transport channels 120*a*, 120*b*. Thus in some embodiments, the mobile wireless network 124 is configured to send an order to increase the capacity of the radio transport channels 120*a*, 120*b* only if the mobile wireless network 124 determines that the mobile wireless network 124 can accommodate such an increase in traffic. In some embodiments, the mobile wireless network 124 is configured to send an order to increase the capacity of the radio transport channels 120*a*, 120*b* only if the mobile wireless network 124 determines that the transmitting mobile wireless device 100*a* is authorized for the proposed increased capacity of the radio transport channel 120*a* and that the receiving mobile wireless device 100*b* is authorized for the proposed increased capacity of the radio transport channel 120*b*.

Figure 2:
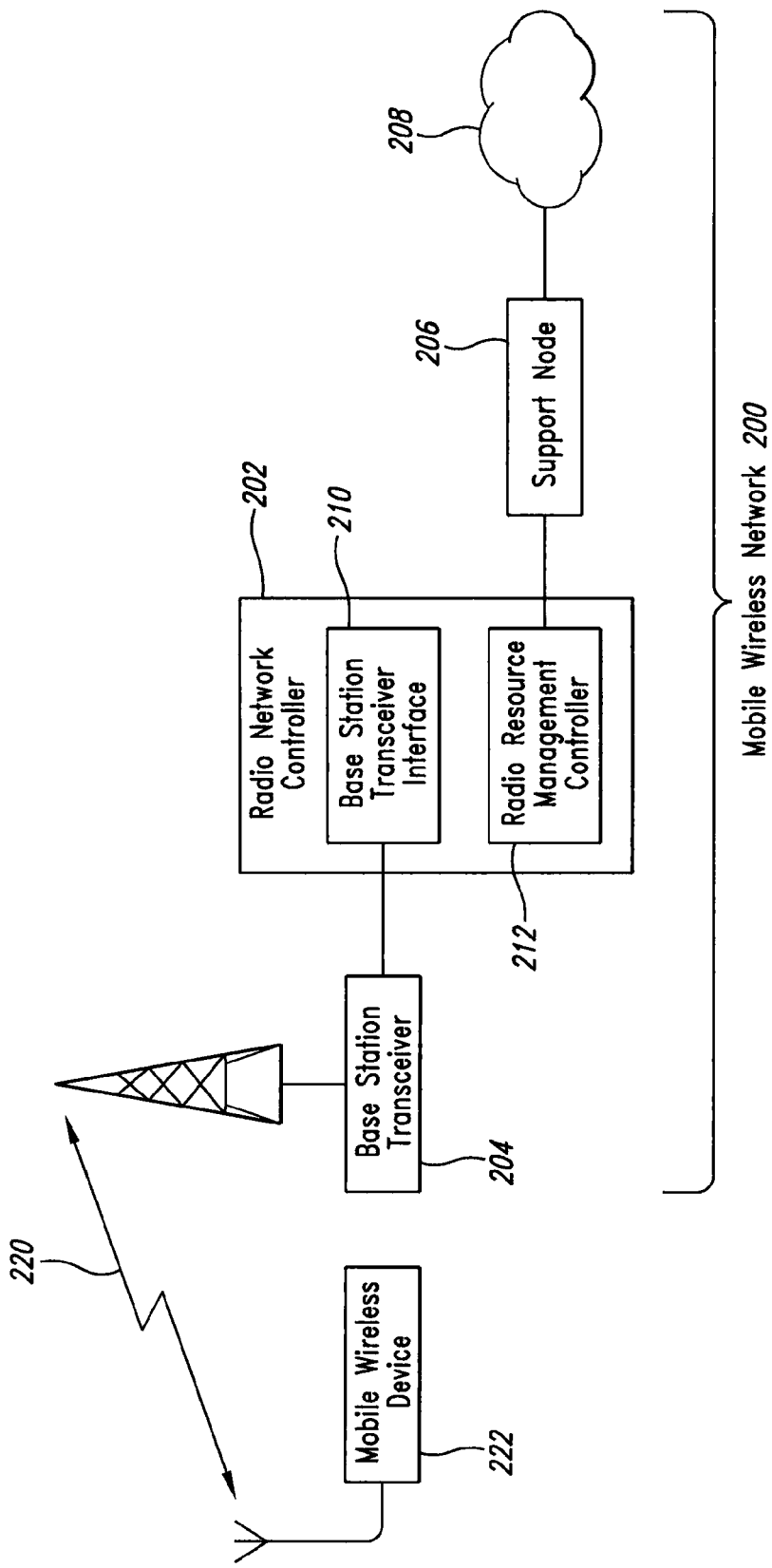
FIG. 2 shows a mobile wireless network comprising a radio network controller.

FIG. 2 shows a mobile wireless network 200 comprising a radio network controller 202. The mobile wireless network 200 is configured to communicate with a mobile wireless device 222 over a radio transport channel 220. The mobile wireless network 200 includes the radio network controller 202, a base station transceiver 204, and a support node 206. The mobile wireless network 200 may have additional components 208 not explicitly shown in FIG. 2 including additional support nodes, radio network controllers and base station transceivers.

The radio network controller 202 includes a base station transceiver interface 210 and a network radio resource management (RRM) controller 212. The base station transceiver interface 210 has the ability to connect the radio network controller 202 to the base station transceiver 204. The base station transceiver 204 is configured to connect to and communicate with the mobile wireless device 222 over the radio transport channel 220. The radio transport channel 220 has a capacity that may be increased or decreased, the method used depending on the protocol of the radio transport channel 220. In some embodiments, the radio transport channel 220 capacity can be changed by changing the spreading factor of the underlying physical channel. In other embodiments, the radio transport channel 220 capacity can be changed by changing the modulation scheme or rate of the underlying physical channel. In yet other embodiments, the radio transport channel 220 capacity can be changed by changing the number of underlying physical channels to which the radio transport channel 220 is mapped. In embodiments where the radio transport channel 220 is shared, the capacity of the portion the radio transport channel 220 available to the mobile wireless device 222 can be changed by the mobile wireless device 222 sending a request to change the priority of the encoded video.

The network RRM controller 212 is configured to receive a request from the mobile wireless device 222 to increase the capacity of the radio transport channel 220. In some embodiments, the request can be a result of change in the radio link condition and available radio resources. The network RRM controller 212 is configured to order an increase in the capacity of the radio transport channel 220 in response to a request from the mobile wireless device 222 to increase the capacity of the radio transport channel 220. In some embodiments, the network RRM controller 212 is configured to order an increase in the capacity of the radio transport channel 220 by sending an order to the base station transceiver 204 to increase the capacity of the radio transport channel 220. In other embodiments, the network RRM controller 212 is configured to order an increase in the capacity of the radio transport channel 220 by sending an order to the mobile wireless device 222 to increase the capacity of the radio transport channel 220.

In some embodiments, the network RRM controller 212 is configured to forward requests for radio transport channel 220 capacity increases to the support node 206. In some embodiments, the network RRM controller 212 is configured to issue an order to increase the radio transport channel 220 capacity only after the support node 206 determines that the mobile wireless network 200 can support the increased traffic that will result from an increase in the radio transport channel 220 capacity. In some embodiments, the radio network controller 212 is configured to issue an order to increase the radio transport channel 220 capacity only after the support node 206 determines that the mobile wireless device 200 is authorized for the proposed increase in the radio transport channel 220 capacity.

Figure 3:
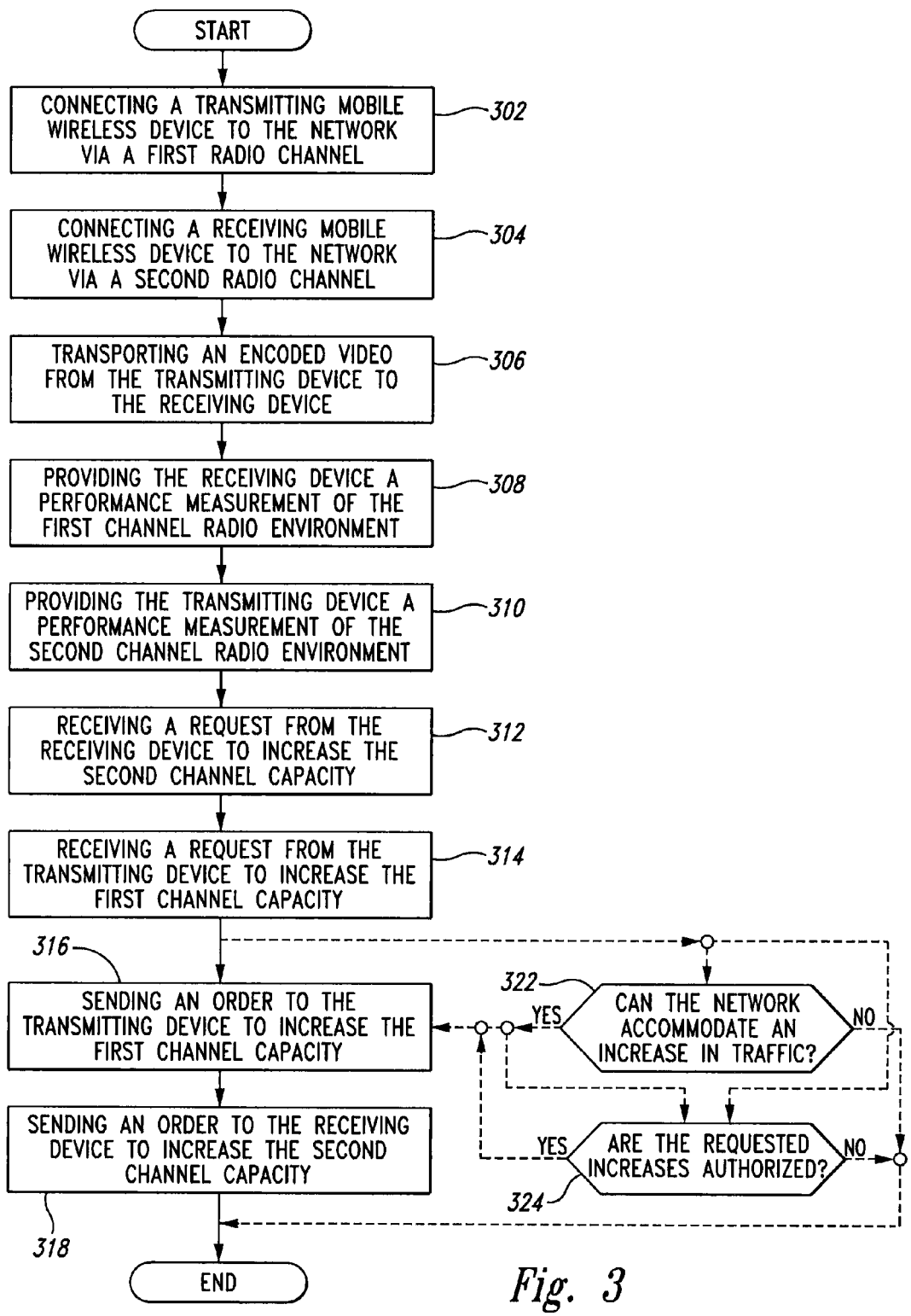
FIG. 3 shows a flow chart of a method for the mobile wireless network of FIG. 1 to support on-request radio transport channel capacity increases.

FIG. 3 shows a flow chart of a method for the mobile wireless network 124 of FIG. 1 to support on-request radio transport channel capacity increases. Step 302 has the mobile wireless network 124 connecting to a transmitting mobile wireless device 100a via a first radio transport channel 120a. This first radio transport channel 120a has an initial capacity for carrying information.

Step 304 has the mobile wireless network 124 connecting to a receiving mobile wireless device 100b via the second radio transport channel 120b. This second radio transport channel 120b has its own initial capacity for carrying information.

Step 306 has the mobile wireless network 124 transporting an encoded video sent from the transmitting mobile wireless device 100a to the receiving mobile wireless device 100b. The encoded video is transported by the first radio transport channel 120a, then by the mobile wireless network 124 and then by the second radio transport channel 120b.

In step 308 the mobile wireless network 124 provides the receiving mobile wireless device 100b with a performance measurement of a radio environment related to the first radio transport channel 120a. In some embodiments, the first channel radio environment performance measurements are made by the transmitting mobile wireless device 100a, which passes the measurements to the mobile wireless network 124. In other embodiments, the mobile wireless network 124 makes these measurements itself.

In step 310, the mobile wireless network 124 provides the transmitting mobile wireless device 100a with performance measurements of a radio environment related to the second radio transport channel 120b. In some embodiments, the second channel radio environment performance measurements are made by the receiving mobile wireless device 100b, which passes the measurements to the mobile wireless network 124. In other embodiments, the mobile wireless network 124 makes these measurements itself.

In step 312, the mobile wireless network 124 receives a request from the transmitting mobile wireless device 100a to increase the capacity of the first radio transport channel 120a. This request may be in response to the video application 110a wanting to send a streaming video clip that requires a higher video transmission rate.

In step 314, the mobile wireless network 124 receives a request from the receiving mobile wireless device 100b to increase the second radio transport channel 120b capacity.

In step 316, the mobile wireless network 124 sends an order to increase the first radio transport channel 120a capacity.

In step 318, the mobile wireless network 124 sends an order to increase the second radio transport channel 120b capacity.

As shown in step 322, in some embodiments the mobile wireless network 124 only orders increases in the capacity of the first and second radio transport channels 120a, 120b if the mobile wireless network 124 first determines that the mobile wireless network 124 can accommodate an increase in traffic that will result from the increased capacity of the first and second radio transport channels 120a, 120b.

As shown in step 324, in some embodiments the mobile wireless network 124 only orders increases in the capacity of the first and second radio transport channels 120a, 120b if the mobile wireless network 124 first determines the mobile wireless devices 100a, 100b are authorized the increased capacity.

FIGS. 4A and 4B show a signal flow diagram of a UMTS/WCDMA embodiment of a method for a mobile wireless network 400 to support on-request radio transport channel capacity increases. The boxes at the top of the diagram represent mobile wireless devices and network elements. The mobile wireless devices include a first user equipment (UE) 402a and a second user equipment (UE) 402b. The network elements include a radio network controller (RNC) 404, a Supporting GPRS Support Node (SGSN) 406 and a Gateway GPRS Support Node 408. The network elements shown, RNC 404 and SGSN 406, are the network elements currently serving UE 402a. The break 410 in the diagram conceals other network elements, including a second RNC and a second SGSN, both of which serve UE 402b in a similar fashion to the way RNC 404 and SGSN 406 serve UE 402a.

FIG. 4A shows the signal flow processes used to initially set up a video session between UE 402a and 402b. The signal flows related to UE 402a are shown, but for clarity, the signal flows related to UE 402b are not. The signal flows related to UE 402b are a mirror image to the signal flows related to UE 402a. For UE 402a to stream a video to UE 402b a video session 432 must be set up. Before the video session 432 can be established, UE 402a and UE 402b each need a radio transport channel or "radio bearer" to connect to the mobile wireless network 400. A radio bearer in UMTS/WCDMA is a transmission channel of defined capacity and quality. To obtain a first radio bearer and the network resource to start the video transmission, UE 402a sends an "Activate Packet Data Protocol (PDP) Context Request" 412 to RNC 404. The RNC 404 forwards this request 412 to the SGSN 406. The SGSN 406 then sends a "Create PDP Context Request" 414 to the GGSN 408. The GGSN 408 then sends a "Create PDP Context Response" 416 back to the SGSN 406. The SGSN 406 sends a "Radio Access Bearer (RAB) Request" 418 to the RNC 404. The RNC 404 then sends a "RAB Setup Request" 420 to UE 402a, which responds with a "RAB Setup Response" 422. Once the bearer is set up, the RNC 404 sends a "RAB Setup Complete" 424 message to the SGSN 406. The SGSN 406 sends an "Activate PDP Context Accept" 426 message to the RNC 404, which forwards this message 426 to UE 402a. The other mobile wireless device, UE 402b, obtains a second radio bearer in a similar manner as described for UE 402a, but with different RNC, SGSN and GGSN than used by UE 402a.

After UE 402a and UE 402b have established adequate radio bearers, they perform a video session setup 430 by exchanging a series of messages. Once the video session setup 430 is complete, the video communication session 432 begins and UE 402a can stream the video to UE 402b.

FIG. 4B shows the signal flow processes used to increase the transmission rate of the video session 432 between UE 402a and 402b. While conducting the video session 432, UE 402a and UE 402b periodically perform a Mobile Rate Control (MRC) performance measurement procedure 434. This procedure 434 includes measuring radio environment parameters related to the radio bearers transporting the video session 432 and measuring the data buffer occupancy. This procedure 434 also includes UE 402a sending its measurements to UE 402b and UE 402b sending its measurements to UE 402a.

If the performance measurements indicate that the radio environments can support increases in the capacity of the radio bearers transporting the video session 432, then UE 402a and UE 402b begin the process for so increasing the radio bearer capacity. UE 402a sends a "Modify PDP Context Request" 436 to RNC 404 that includes a request for an increase in the capacity of the first radio bearer. The RNC 404 forwards this request to the SGSN 406, which forwards it to the GGSN 408. The GGSN 408 sends a "Modify PDP Context Response" 438 to the SGSN 406. The SGSN 406 then sends a "Modify RAB Request" 440 to the RNC 404. The RNC 404 modifies the RAB by sending a "RAB Reconfiguration Request" 442 to UE 402a, with a proposed RAB that has an increased capacity over the current RAB. In some embodiments, the message is a transport channel reconfiguration to change the transport format block size or bandwidth to thereby increase the bit rate of the radio bearer. In other embodiments, the message is a radio bearer reconfiguration to change the type of channel. If the proposed RAB is acceptable, RNC 404 and UE 402a then increase the capacity of the radio access bearer. UE 402a sends a "RAB Reconfiguration Complete" message 444 back to the RNC 404. Meanwhile, UE 402b has conducted a parallel procedure to request and execute an increase in the capacity of its radio access bearer.

UE 402a and UE 402b exchange information about the capacities of their radio access bearers. Once UE 402a determines that both radio access bearer's capacity have increased satisfactorily, UE 402a increases the encoding rate of the video it is sending to UE 402b and the video session continues at an increased rate 452.

FIG. 5 shows a flow chart of a method for the transmitting mobile wireless device 100a to transmit rate controlled video to the receiving mobile wireless device 100b. The mobile wireless devices 100a, 100b and the mobile wireless network 124 of FIG. 1 are used by way of an example.

In step 502, the transmitting mobile wireless device 100a encodes the video at an encoding rate.

In step 504, the transmitting mobile wireless device 100a connects to the mobile wireless network 124 over the first radio transport channel 120a. Separately, the mobile wireless network 124 can connect to the receiving mobile wireless device 100b via the second radio transport channel 120b.

In step 506, the transmitting mobile wireless device 100a sends the encoded video to the receiving mobile wireless device 100b over the first radio transport channel 120a, the mobile wireless network 124, and the second radio transport channel 120b.

In step 508, the transmitting mobile wireless device 100a receives performance measurements of radio environments related to the first and second radio transport channels 120a, 120b. In some embodiments, the transmitting mobile wireless device 100a makes the measurement of the radio environment related to the first radio transport channel 120a and the receiving mobile wireless device 100b makes the measurement of the second radio transport channel 120b radio environment. The transmitting mobile wireless device 100a and the receiving mobile wireless device 100b then exchange performance measurements. In other embodiments, the mobile wireless network 124 makes the performance measurements of the radio environments related to the first and second radio transport channels 120a, 120b and then the mobile wireless network 124 transmits the performance measurements to both the transmitting mobile wireless device 100a and the receiving mobile wireless device 100b.

In step 510, the transmitting mobile wireless device 100a determines whether the performance measurements indicate the radio environments related to the first and second radio transport channels 120a, 120b can support a proposed increase in the capacities of these channels 120a, 120b. The increase proposed by the transmitting mobile wireless device 100a may be to accommodate higher rates of video encoding and transmission. If the transmitting mobile wireless device 100a determines that either the first or the second radio transport channels 120a, 120b can support the proposed increase, then the transmitting mobile wireless device 100a proceeds to step 512. If not, the transmitting mobile wireless device 100a terminates this method without further action.

In step 512, the transmitting mobile wireless device 100a sends a request to the mobile wireless network 124 to increase the first radio transport channel capacity.

In step 514, the transmitting mobile wireless device increases the first radio transport channel capacity in response to an order from the mobile wireless network 124 to do so. In some embodiments, the transmitting mobile wireless device 100a increases the first radio transport channel capacity by decreasing the spreading factor of a physical channel underlying the first radio transport channel. In other embodiments, the transmitting mobile wireless device 100a increases the first radio transport channel capacity by changing the modulation scheme or modulation rate of the underlying physical channel. In yet other embodiments, the transmitting mobile wireless device 100a increases the first radio transport channel capacity by increasing the number of underlying physical channels to which the first radio channel is mapped. If the first radio transport channel 120a is shared, then the transmitting mobile wireless device 100a can send a request to increase the priority of the encoded video.

In step 516, the transmitting mobile wireless device 100a increases the encoding rate in response to an increase in the capacities of the first and second radio transport channels 120a, 120b. In some embodiments, the transmitting mobile wireless device 100a learns of any increases in the capacity of the radio transport channels when the transmitting mobile wireless device 100a and the receiving mobile wireless device 100b send each other messages over the mobile wireless network 124 that such increases in radio transport channel capacities have occurred. In other embodiments, the mobile wireless network 124 detects the increases in the capacities of the first and second radio transport channels 120a, 120b and then sends messages so indicating to the transmitting mobile wireless device 100a and the receiving mobile wireless device 100b.

The components herein may in some embodiments be implemented as a computer processor coupled to a memory, the memory containing instructions that when executed by the computer processor, perform the functions as described above. In other embodiments, the components may be realized as hard-wired circuits.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A transmitting mobile wireless device to transmit rate controlled video to a receiving mobile wireless device comprising:
a video codec configured to encode a video at an encoding rate;
a radio transceiver configured to connect to a mobile wireless network via a first radio transport channel having a first capacity, the mobile wireless network configured to connect to the receiving mobile wireless device via a second radio transport channel having a second capacity, the radio transceiver to send the encoded video to the receiving mobile wireless device over the first channel, the mobile wireless network, and the second channel;
a radio resource management (RRM) module coupled with the radio transceiver and configured to change the capacity of the first radio transport channel;
a performance monitor configured to receive performance measurements of radio environments related to the first and second channels; and
the RRM module configured to send a request to the mobile wireless network to increase the first channel capacity if the performance measurements indicate the radio environments related to the first and second channels can support a proposed increase in the first channel capacity and a proposed increase in the second channel capacity.

2. The transmitting mobile wireless device of claim 1 wherein the RRM module is configured to increase the first channel capacity responsive to an order from the mobile wireless network to increase the first channel capacity.

3. The transmitting mobile wireless device of claim 1 wherein the RRM module is configured to increase the first channel capacity by decreasing a spreading factor of the first channel.

4. The transmitting mobile wireless device of claim 1 wherein the RRM module is configured to increase the first channel capacity only if a determination is received from the mobile wireless network that the mobile wireless network can accommodate an increase in traffic resulting from the proposed increased in the first channel capacity.

5. The transmitting mobile wireless device of claim 1 wherein the video codec is configured to increase the encoding rate responsive to the first and second radio transport channels increasing their capacities.

6. The transmitting mobile wireless device of claim 1 wherein the performance measurements of the radio environments related to the first and second channels are received from the mobile wireless network.

7. The transmitting mobile wireless device of claim 1 wherein the performance measurements of the radio environment related to the first channel are made by the transmitting mobile wireless device.

8. A radio network controller configured for operation in a mobile wireless network comprising:
a base station transceiver interface configured to connect to a base station transceiver, the base station transceiver configured to connect the mobile wireless network to a mobile wireless device via a radio transport channel having a radio transport channel capacity;
a radio resource management (RRM) controller configured to send an order to the mobile wireless device to increase the radio transport channel capacity, responsive to a request from the mobile wireless device to increase the radio transport channel capacity; and
the RRM controller configured to increase the radio transport channel capacity in cooperation with the mobile wireless device.

9. The radio network controller of claim 8 wherein:
the RRM controller is configured to forward the request to a support node part of the mobile wireless network; and
the RRM controller is configured to order the mobile wireless device to increase the radio transport channel capacity only if the support node determines the mobile wireless network can accommodate an increase in traffic resulting from the requested increase in the radio transport channel capacity.

10. A method for a mobile wireless network to support on-request radio transport channel capacity increases comprising:
connecting a transmitting mobile wireless device to the mobile wireless network via a first radio transport channel, the first channel having a first channel capacity;

connecting a receiving mobile wireless device to the mobile wireless network via a second radio transport channel, the second channel having a second channel capacity;

transporting an encoded video sent from the transmitting mobile wireless device to the receiving mobile wireless device over the first channel, the mobile wireless network, and the second channel;

providing to the receiving mobile wireless device a performance measurement of a radio environment related to the first channel;

providing to the transmitting mobile wireless device a performance measurement of a radio environment related to the second channel;

receiving a request from the transmitting mobile wireless device to increase the first channel capacity;

receiving a request from the receiving mobile wireless device to increase the second channel capacity;

sending an order to the transmitting mobile wireless device to increase the first channel capacity; and sending an order to the receiving mobile wireless device to increase the second channel capacity.

11. The method of claim 10 further comprising measuring the performance of the radio environment related to the first channel.

12. The method of claim 10 further comprising receiving from the transmitting mobile wireless device the performance measurement of the radio environment related to the first channel.

13. The method of claim 10 wherein the actions of increasing the first radio transport channel capacity and increasing the second radio capacities are performed only if the mobile wireless network determines that the mobile wireless network can accommodate an increase in traffic resulting from the increase in capacity of the first and second channels.

14. A method for a transmitting mobile wireless device to transmit rate controlled video to a receiving mobile wireless device comprising:

encoding a video at an encoding rate;

connecting to a mobile wireless network via a first radio transport channel, the first channel having a first channel capacity, the mobile wireless network configured to connect to the receiving mobile wireless device via a second radio transport channel, the second channel having a second channel capacity;

sending the encoded video to the receiving mobile wireless device over the first channel, the mobile wireless network, and the second channel;

receiving performance measurements of radio environments related to the first and second channels;

sending a request to the mobile wireless network to increase the first channel capacity if the performance measurements indicate the radio environment related to the first channel can support a proposed increase in the first channel capacity and the radio environment related to the second channel can support a proposed increase in the second channel capacity;

increasing the first channel capacity responsive to an order from the mobile wireless network to increase the first channel capacity; and increasing the encoding rate responsive to learning of an increase in the first channel capacity and an increase in the second channel capacity.

15. The method of claim 14 wherein increasing the first channel capacity comprises decreasing a spreading factor of a physical channel underlying the first channel.

16. The method of claim 14 wherein increasing the first channel capacity comprises increasing the modulation rate of a physical channel underlying the first channel.

17. The method of claim 14 wherein increasing the first channel capacity comprises increasing a number of underlying physical channels the first channel is mapped to and sending a request to increase priority of the encoded video.

18. The method of claim 14 wherein increasing the first channel capacity comprises increasing the code allocation.

19. The method of claim 14 wherein increasing the first channel capacity comprises increasing the tone allocation.

* * * * *